April 21, 1964

M. MOLLICK 3,129,719

PILOT POSITIONER

Filed Feb. 2, 1960

INVENTOR
MILTON MOLLICK
BY
Robertson and Smythe
ATTORNEYS

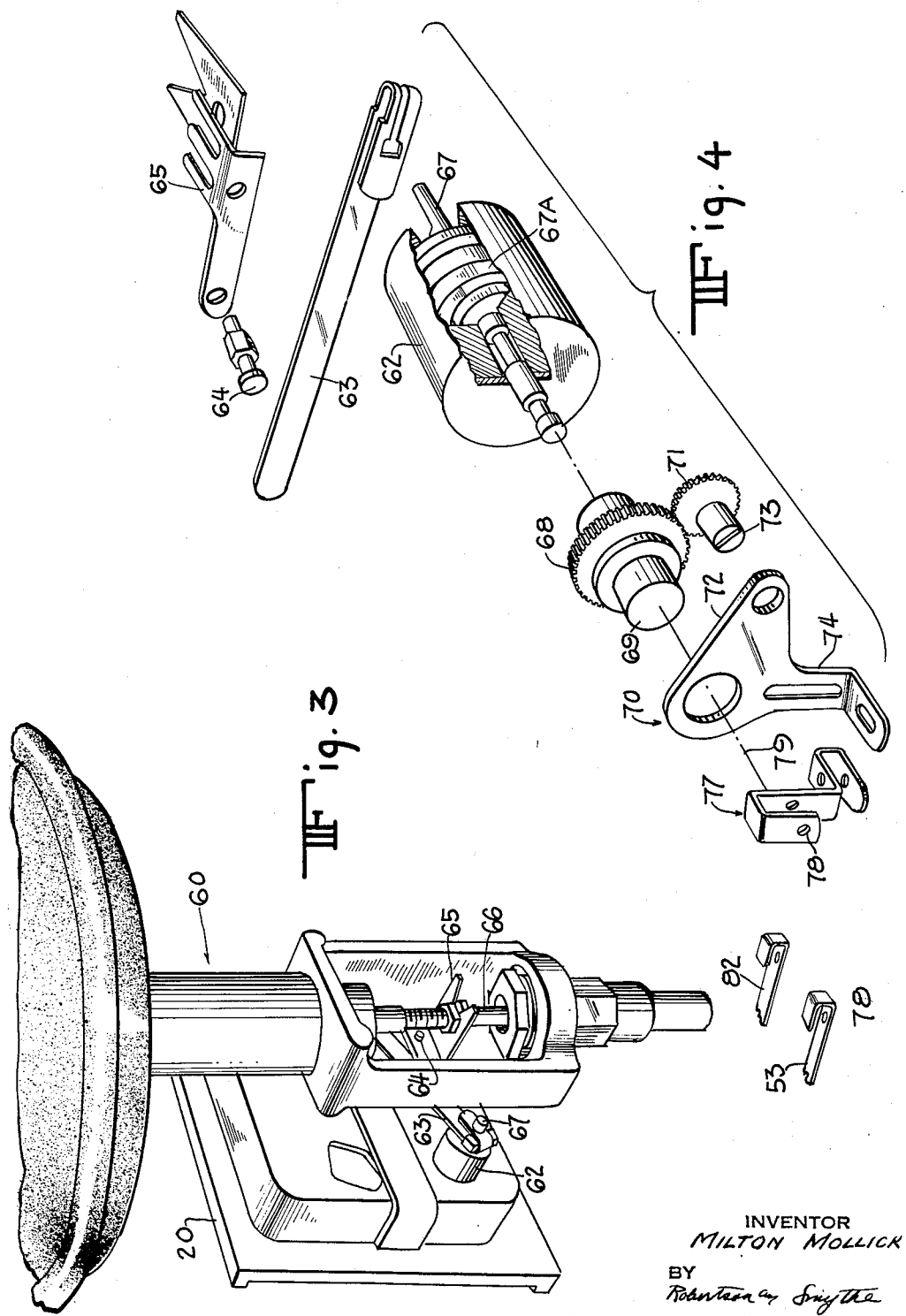

INVENTOR
*MILTON MOLLICK*
BY
*Robertson & Smythe*
ATTORNEY

United States Patent Office 3,129,719
Patented Apr. 21, 1964

3,129,719
PILOT POSITIONER
Milton Mollick, Allentown, Pa., assignor to Ametek, Inc., New York, N.Y., a corporation of Delaware
Filed Feb. 2, 1960, Ser. No. 6,279
2 Claims. (Cl. 137—489)

This invention relates to pneumatically operated instruments and particularly to a combined positioner and controller for process control valves or the like.

In process control, valves may be employed to regulate flow of liquids or the like, the valves being controlled in accordance with a variable condition such as temperature, pressure, flow, etc. The condition to be controlled can be used to operate a pneumatic pilot arrangement wherein a nozzle and a valve or flapper are moved relative to each other so as to vary the air pressure in the nozzle in accordance with the condition to be controlled. The nozzle can be connected to a source of supply air through a suitable restriction so that, for example, as the flapper is moved to closed position relative to the nozzle by a change in the condition, air pressure in the nozzle will rise and vice versa. The change in nozzle air pressure is used to operate a pressure relay for providing a pressure proportional to the nozzle air pressure. The output pressure of the pressure relay is connected to a diaphragm or motor operating the control valve. A valve positioner is interposed between the controller and valve so as to obtain faster speed of response, more precise valve stem positioning, to overcome valve packing friction and to control fluid pressure variations. It is desirable to have a unitary structure or assembly including the various parts of a controller and a position feedback which perform both control and positioning functions and which can be simply adjusted to change stroke and to change bias in accordance with the particular valve involved.

One of the objects of the invention is to provide a combined positioner and controller which is a unitary device and which can be adjusted to provide a standard input.

Another object of the invention is to provide a pilot positioner which can have its bias and stroke easily adjusted so as to fit various valves or to provide selected results.

Another object of the invention is to provide a combination positioner and controller which is easy to adjust and set and which permits the use of a variety of process variables such as pressure, temperature or which will accept a transmitted signal.

A still further object of the invention is to provide an arrangement which can be used with various supply pressures and which can be employed with both direct and reverse feedback.

In one aspect of the invention, a unitary combined positioner and controller is provided having a condition responsive means, such as a Bourdon tube, connected to the process or condition to be controlled. In one form, the Bourdon tube may be connected to a lever arrangement mounted on a differential carriage structure for controlling the relative position of a flapper and nozzle. The differential carriage has the motion of the control valve fed back thereto through a linkage or connecting means. The feedback linkage includes a means for adjusting the significance of the stroke of the control valve and also the bias or the position attained by the valve in response to a given output change from the controller. In other words, regardless of the stroke of the particular valve being controlled, the movement transmitted to the differential carriage is always the same or substantially the same.

These and other objects, advantages and features of the invention will become apparent from the following description and drawings which are merely exemplary.

In the drawings:

FIG. 3 is a rear perspective view showing the connection between a valve and the feedback mechanism.

FIG. 4 is an exploded view of the connection between the instrument and the control valve.

Figure 2:
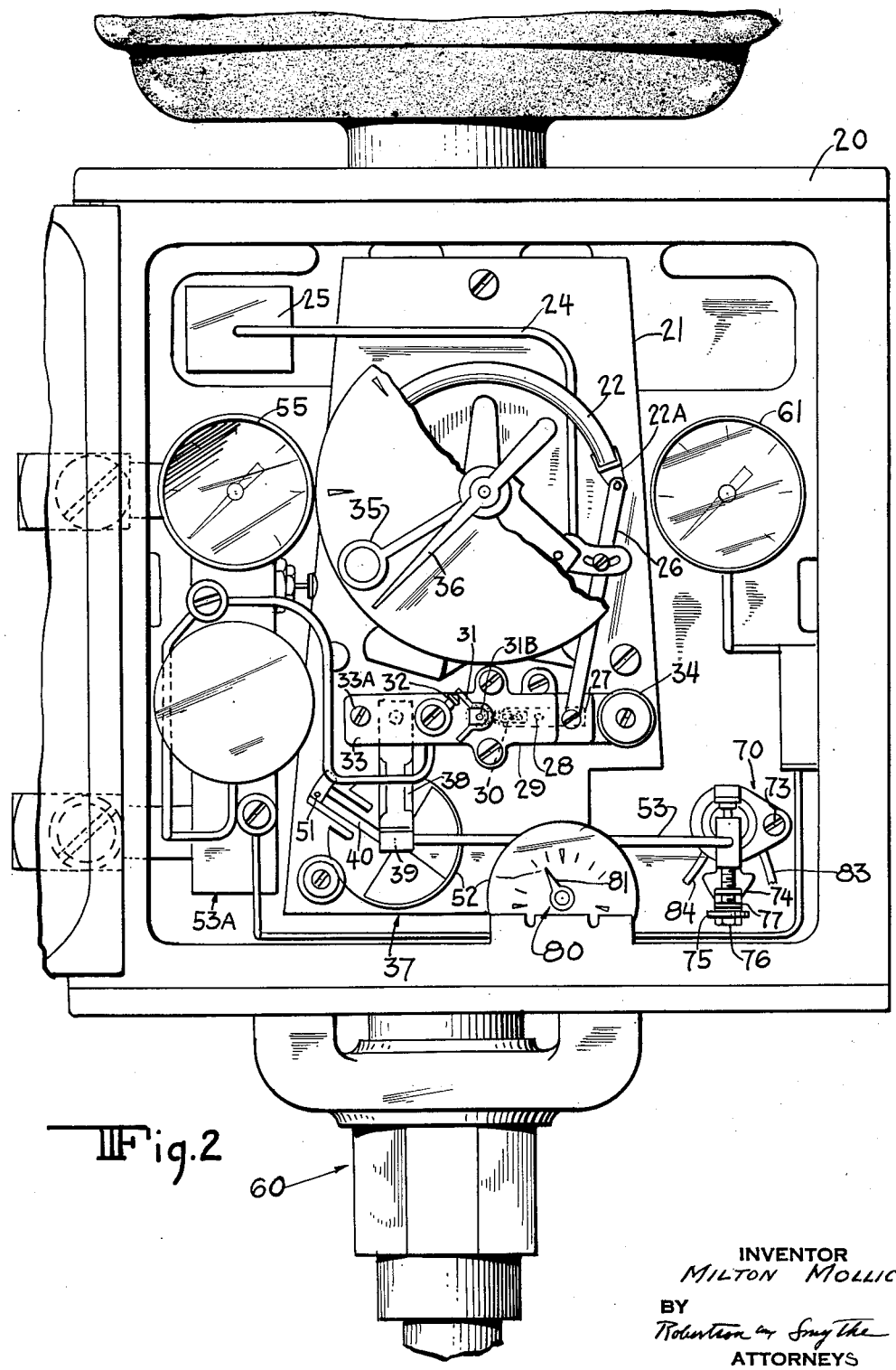
FIG. 2 is a front view of the pilot, the cover being open.

A general description first will be given of the pilot structure, one form of which is shown in FIG. 2, such being described in detail in U.S. Patent No. 2,770,247. Instrument casing 20 serves as a frame upon which the various elements are mounted including measuring assembly plate 21. Measuring assembly plate 21 can have the various measuring, indicating and pneumatic control portions mounted thereon. The control valve is fastened to the casing in any desired manner.

Figure 1:
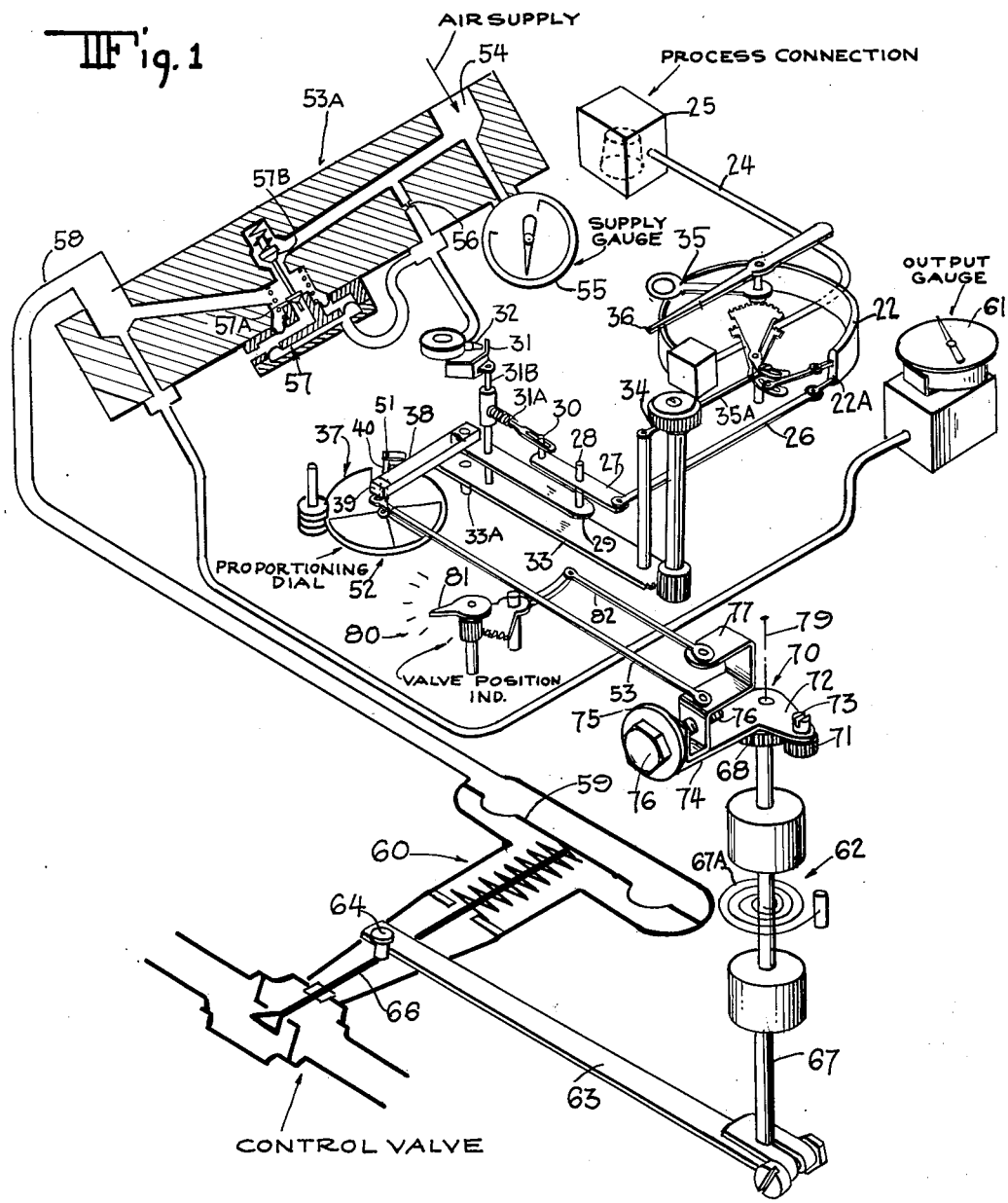
FIG. 1 is a schematic view of one form of the invention.

Referring to FIGS. 1 and 2, Bourdon tube 22, or other measuring element, can be connected through line 24 to a connection block 25 to which the measured variable is fed or connected. Tip 22A of Bourdon tube 22 is connected through link 26 to lever 27 which is pivoted at 28 to differential carriage or inner movement 29. End 30 of lever 27 is connected to flapper 31 through lever 31A in a manner to rotate or oscillate the same about pivot 31B in accordance with changes in the measured variable. Nozzle 32 is mounted on carrier plate or outer movement 33, the carrier plate being pivoted about an axis 33A so as to permit movement of the nozzle and the flapper relative to each other, said carrier plate being adjustable by means of a set point adjusting knob 34. Nozzle 32 can be rotated so as to cooperate with the other arm of flapper 31. The carrier plate 33 is connected by a suitable link mechanism 35A (FIG. 1) with set point hand 35. The Bourdon tube 22 can be connected through a gauge movement with indicating pointer 36.

Figure 6:
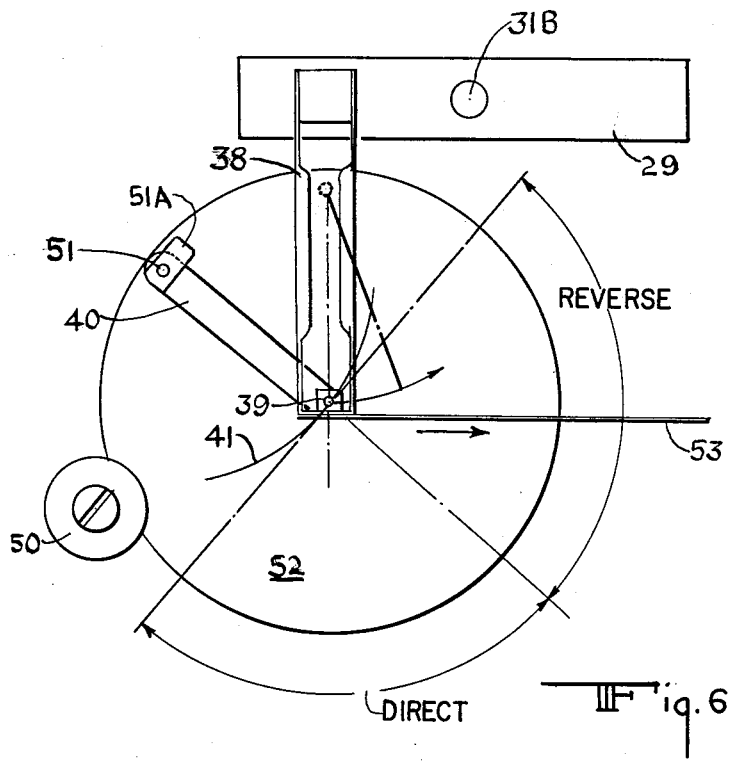
FIG. 6 is a front view of the adjustable proportional band assembly.
Figure 5:
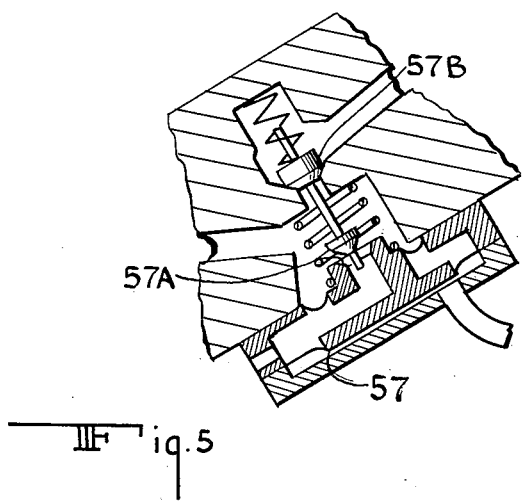
FIG. 5 is a sectional view of the valve controlled by the relay nozzle diaphragm with the inlet port closed and the exhaust port open.

The valve position feedback arrangement is connected through an adjustable proportional band assembly 37 to differential carriage 29 through link 38. This structure is described in detail in the aforementioned Patent 2,770,-247. Briefly, link 38 is pivotally mounted at 39 (FIG. 6) to arm 40, arm 40 being pivotally connected at 51 to the elevated extension 51A of proportioning dial 52. The dial 52 is adapted to be frictionally rotated to a selected set or locked position by adjusting drive member 50. Movement of feedback connecting link 53 will cause movement of link 38 according to the position of pivot point 51. If pivot point 51 is at the left of center (as seen in FIGS. 2 and 6), movement of link 53 to the right in the direction of the arrow (FIG. 6) will cause the arm 40 and pivot 39 to pivot counterclockwise about the set pivot 51 along the arc 41 and thus impart movement of link 38 upwardly. The amount of movement will depend upon the position of pivot 51 relative to the link 53. If proportioning dial 52 is rotated to the right of the center, then movement of link 53 to the right will cause downward movement of arm 38.

A pressure relay assembly indicated generally by 53A is connected to a source of supply air at 54 (FIG. 1), supply pressure gauge 55 being mounted on said relay, there being the usual restriction 56 in the air passage to nozzle 32. Relay diaphragm 57 is actuated by nozzle pressure to control air pressure in line 58 for operating diaphragm 59 of control valve 60. The output pressure can be indicated by output gauge 61. It is to be understood that various types of pressure relays may be used. Any desired air pressure can be employed in comparison with a controller which must be designed to take high pressure only.

The instrument case 20 is suitably fastened to the control valve as shown in FIG. 3, thereby forming a unitary arrangement.

Bearing 62, shown schematically in FIG. 1, has spring means 67A therein tending to urge shaft 67 and connecting arm 63 (FIGS. 1 and 2) in a counterclockwise direction (FIG. 1) against pin 64. Pin 64 is fastened through bracket 65 (FIG. 3) to control valve stem 66. Connecting arm 63 is adjustably mounted on input shaft 67. The other end of input shaft 67 is connected to gear 68, reduced hub 69 (FIG. 4) of gear 68 being arranged to rotatably carry bell crank 70. Bell crank 70 has pinion 71 mounted on arm 72 thereof, pinion 71 engaging gear 68. Thus, when pinion 71 is turned by means of the slot in screw 73, crank 70 will be rotated relative thereto so as to adjust the relative positions of the arm 63 and feedback connecting link 53. The parts will stay in their adjusted position. In this manner, the bias or position of the control valve relative to the controller can be moved up or down as will be described hereafter.

The other arm 74 of crank 70 has an extension 75 carrying stroke adjusting screw 76 therein. Stroke adjusting screw 76 is engaged with feedback link connecting bracket 77 so as to move the relative position of the connection 78 of feedback link 53 thereto toward or away from the axis 79 of shaft 67. Thus, the movement of the control valve stem 66 relative to the feedback connecting link 53 can be varied. It should be apparent that the bias and stroke can be changed as needed so that regardless of position or travel, the same input to the instrument through connecting link 53 can be obtained.

In order to assist in setting the valve and controller, a valve position indicator or calibrating means 80 may have a pointer 81 connected to crank 70 through link 82, there being a slip clutch connection therebetween.

A suitable stop means having legs 83, 84 can be mounted on the case adjacent bearing 62 carried by the case, said stop being arranged to cooperate with arm 74 of bracket 70 so as to prevent overtravel of the parts.

Describing operation, process pressure enters through process connection 25 and actuates Bourdon tube 22 and its indicating pointer 36. Bourdon motion is carried by link 26 to lever 27 in the control movement. Assuming a decrease in condition measurement, link 26 will be lowered rotating lever 27 clockwise, and pivot 31B counterclockwise. This will move flapper 31 toward nozzle 32.

The supply pressure, shown on supply gauge 55, will feed through restriction 56 to nozzle 32 and relay diaphragm 57. Closing of nozzle 32 will increase pressure and move the relay nozzle diaphragm 57 toward the pressure relay assembly 53A (FIG. 1) moving exhaust port 57A toward the valve stem to close it and to open inlet port 57B. Output pressure then will increase and the control valve stem will move down to open the control valve. This will rotate input shaft 67 counterclockwise (FIGS. 1, 2) moving link 53 to the right in the direction of the arrow (FIG. 6). Proportioning link 40, being pivoted at its outer end at 51 to the set proportioning dial 52, will force pivot 39 to travel on an arc around the pivot 51. Thus, motion of link 53 to the right will result in an upward thrust on link 38, which will rotate inner movement 29 clockwise about pivot 31B thereby lowering the pivot 28 and turning lever 27 counterclockwise around pivot 28 so as to produce a flapper movement away from the nozzle 32, largely offsetting the input motion and pneumatic sequence described above. The result is that an equilibrium is reached with a change of valve stem position proportional to the change of measurement.

As will be described, feedback motion may be standardized by adjusting the bias and stroke adjustment on input shaft 67 until valve position indicator 80 correctly indicates the open and closed position of the valve.

Control point setting may be accomplished by turning set point knob 34 to swing the entire outer movement or carrier plate up or down, around pivot 33A. The amount of setting motion is shown by the set pointer 35.

To adjust the positioner, the control valve can be moved to an extreme (fully open or closed) position by set knob 34, the valve position indicator 80 being noted. The position indicator is moved to corresponding open or closed position by turning the valve bias adjustment screw 73 with a screw driver. The control valve then is moved to the opposite extreme by the set knob. The reading on the valve position indicator 80 again is noted. The valve position indicator should move through an arc equal to the graduated portion of scale and should stop at the end graduation. If it should pass the end graduation, the valve stroke adjusting screw 76 is turned to reduce the travel of the pointer. If the valve position indicator does not reach the end, screw 76 is turned in the opposite direction. The control valve is further operated and the indicator adjusted for the desired bias and stroke, until the valve position indicator indicates exactly the extremes of the valve stroke on the end graduations of the scale.

Thus, the invention provides among other aspects, a means to vary the linkage to convert differing strokes to a predetermined feedback motion.

By virtue of the instrument adjustments permitting reversal of feedback and reversal of nozzle and flapper action, a degree of flexibility can be obtained and hitherto attainable. The instrument can provide four control modes for any valve configuration, air to open or air to close and whether the stem moves up or down to close the valve. The four modes are:

(1) Direct action proportional
(2) Reverse action proportional
(3) Direct action differential gap
(4) Reverse action differential gap.

It should be apparent that details of construction can be changed without departing from the spirit of the invention except as defined in the appended claims.

What is claimed is:

1. A combined pneumatic control and positioning apparatus comprising a housing having therein a nozzle device and a flapper device, said devices being movable relative to each other to control output pressure, a variable condition responsive means, a differential carriage oscillatable about an axis, device operating means pivotally mounted on said carriage and connected to said condition responsive means for operation thereby, the pivot of said device operating means being spaced from the axis of said carriage, one of said devices being rotatable about the axis of said carriage, an adjustable carrier pivotally mounted on an axis, the other of said devices being mounted on said carrier so that said devices can be moved relative to each other; a pneumatic relay for putting out a variable control pressure in response to the relative position of said differential carriage and said devices; a pneumatically operated control valve for controlling the variable in response to output control pressures from said relay, said housing being mounted directly on said valve; and a mechanical feedback indication to be combined with the indication of said variable condition responsive means, said feedback linkage including a proportional valve band adjusting means interposed between the indication of valve position and said differential carriage; and valve bias and stroke adjusting means.

2. A combined pneumatic control and positioning apparatus comprising a housing having therein a nozzle device and a flapper device, said devices being movable relative to each other to control output pressure, a variable condition responsive means, a differential carriage oscillatable about an axis, device operating means pivotally mounted on said carriage and connected to said condition responsive means for operation thereby, the pivot of said device operating means being spaced from the axis of said carriage, one of said devices being rotatable about the axis of said carriage, an adjustable carrier pivotally mounted on an axis, the other of said devices being mounted on said carrier so that said devices can be moved relative to each other; a pneumatic relay for putting out a variable control pressure in response to the relative position of said differential carriage and said devices; a pneumatically operated control valve for controlling the variable in response to output control pressures from said relay, said housing being mounted directly on said valve; and a mechanical feedback indication to be combined with the indication of said variable condition responsive means, said feedback linkage including a proportional valve band adjusting means interposed between the indication of valve position and said differential carriage; valve bias and stroke adjusting means, and a valve position indicator between said bias and stroke adjusting means and said proportional band adjusting means.

References Cited in the file of this patent

UNITED STATES PATENTS

| | | |
|---|---|---|
| 2,240,243 | Mason | Apr. 29, 1941 |
| 2,240,244 | Cook | Apr. 29, 1941 |
| 2,293,647 | Harper | Aug. 18, 1942 |
| 2,631,570 | Bowditch | Mar. 17, 1953 |
| 2,770,247 | Huston | Nov. 13, 1956 |
| 2,816,562 | Dyson | Dec. 17, 1957 |
| 2,824,548 | Roche et al. | Feb. 25, 1958 |
| 2,852,947 | Klinger | Sept. 23, 1958 |
| 2,939,430 | Westbury | June 7, 1960 |